US007712177B2

(12) United States Patent
Yoshida et al.

(10) Patent No.: US 7,712,177 B2
(45) Date of Patent: May 11, 2010

(54) CLEANING SHEET AND ITS PRODUCTION METHOD AS WELL AS TRANSPORTING MEMBER HAVING SUCH CLEANING SHEET

(75) Inventors: Yoshinori Yoshida, Osaka (JP); Yohei Maeno, Osaka (JP); Jirou Nukaga, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 10/802,883

(22) Filed: Mar. 18, 2004

(65) Prior Publication Data

US 2004/0182418 A1 Sep. 23, 2004

(30) Foreign Application Priority Data

Mar. 20, 2003 (JP) .............................. 2003-077992
Mar. 20, 2003 (JP) .............................. 2003-078055

(51) Int. Cl.
*B08B 13/00* (2006.01)
*B32B 7/02* (2006.01)

(52) U.S. Cl. .......................... 15/210.1; 428/200; 134/2; 134/6; 134/32

(58) Field of Classification Search .............. 428/423.1, 428/500, 220; 134/2, 6, 32; 15/208, 210.1
See application file for complete search history.

(56) References Cited

U.S. PATENT DOCUMENTS

| | | | | |
|---|---|---|---|---|
| 4,342,793 | A * | 8/1982 | Skinner et al. | 427/493 |
| 6,817,052 | B2 * | 11/2004 | Grube | 15/3 |
| 2002/0190737 | A1 * | 12/2002 | Maekawa et al. | 324/754 |
| 2003/0027496 | A1 * | 2/2003 | Back et al. | 451/36 |

FOREIGN PATENT DOCUMENTS

| | | | |
|---|---|---|---|
| JP | 07-244074 | A | 9/1995 |
| JP | 9129577 | A | 5/1997 |
| JP | 10-019928 | A | 1/1998 |
| JP | 11288907 | A | 10/1999 |
| JP | 2002158199 | A | 5/2002 |

* cited by examiner

*Primary Examiner*—Thao T. Tran
(74) *Attorney, Agent, or Firm*—Sughrue Mion, PLLC

(57) ABSTRACT

To provide a cleaning sheet that can remove foreign matter adhering on a probe needle without wearing the probe needle and that does not allow the foreign matter to re-adhere on the probe needle, the cleaning sheet has a cleaning layer on at least one surface thereof, the cleaning layer containing a urethane polymer and a vinyl monomer.

19 Claims, 2 Drawing Sheets

CLEANING SHEET AND ITS PRODUCTION METHOD AS WELL AS TRANSPORTING MEMBER HAVING SUCH CLEANING SHEET

BACKGROUND OF THE INVENTION

1. Field of the Invention

The present invention relates to a cleaning sheet for removing foreign matter adhering on the tip of a probe needle of a probe card and its production method and to a transporting member having such a cleaning sheet as well as to a cleaning method for removing foreign matter from the tip of a probe needle by using the cleaning sheet or transporting member.

2. Description of a Related Art

Probe cards are used for conduction tests of chips formed on a semiconductor wafer. The conduction test is performed by contacting a probe needle of a probe card on an electrode pad formed on the surface of a chip and measuring a contact resistance of the probe needle, according to which it is judged whether the chip is good or defective. The test of wafers is performed as follows. When a probe needle is contacted on an electrode pad formed of, for example, aluminum a constant pressure is applied so that the tip of the probe needle scrapes natural oxide film consisting of aluminum oxide or the like formed on the surface of the electrode pad, ensuring establishment of electrical connection between the probe needle and the electrode pad. Adherence of the aluminum oxide or the like scraped out by the probe needle and having insulating properties on the tip of the probe needle will result in variation of the contact resistance upon contacting the probe needle on the electrode pad, which may cause some trouble in subsequent conduction tests. Therefore, the foreign matter adhering on the tip of the probe needle must be removed periodically.

Methods of removing foreign matter adhering on the tip of a probe needle are disclosed in, for example, Japanese Patent Application Laid-open Nos. 7-244074, 10-300777, and 10-339766, in which the tip of the probe needle is contacted on a layer made of a resin having dispersed therein an abrasive material such as diamond powder, alumina, silicon carbide, or glass or a layer on which such an abrasive material is fixed with an adhesive to remove the foreign matter. Further, Japanese Patent Application Laid-open No. 10-19928 discloses a method of removing foreign matter by using a cleaning sheet having a pressure-sensitive adhesive force (as measured according to Japanese Industrial Standards JIS Z 0237) of 100 g/25 mm to 250 g/25 mm. Japanese Patent Application Laid-open No. 11-133116 discloses a method of removing foreign matter by using a cleaning sheet made of at least one of metal fiber, carbon fiber, and ceramic fiber.

However, in the method of removing foreign matter by contacting the tip of a probe needle on the cleaning layer containing an abrasive material such as diamond powder, the probe needle itself is worn off by the abrasive material upon cleaning, resulting in a shortened service life of the probe card. In the case where the foreign matter once removed from the tip of the probe needle by cleaning adheres again to the foot of the needle, the foreign matter may fall on a wafer to contaminate the wafer upon a subsequent conduction test. The method of removing foreign matter by using a cleaning sheet having a pressure-sensitive adhesive layer thereon causes no problem of wearing off of the probe needle or re-adhering of the foreign matter on the probe needle. However, the method still has the problem that the foreign matter strongly fixed to the probe needle cannot be removed or a part of the pressure-sensitive layer is transferred onto the probe needle, thus causing the problem of so-called adhesive deposit. With the method of removing foreign matter by using a cleaning sheet made of at least one of material filer, carbon fiber, and ceramic fiber, the effect of reducing the wearing off of the probe needle or re-adhering of foreign matter is confirmed but perfect removal of the foreign matter is not achieved.

SUMMARY OF THE INVENTION

The present invention has been achieved under the aforementioned circumstances and it is an object of the present invention to provide a cleaning sheet that allows for removal of foreign matter without wearing off a probe needle when the foreign matter adhering on a probe needle of a probe card is removed and without causing re-adhering of the foreign matter that has once been removed from the needle and a transporting member having such a cleaning sheet and its production method. It is another object of the present invention to provide a transporting member having such a cleaning sheet. It is still another object of the present invention to provide a cleaning method using such a cleaning sheet.

To achieve the aforementioned objects, the cleaning sheet of the present invention is a cleaning sheet for removing foreign matter adhering on the tip of a probe needle of a probe card, the cleaning sheet having a cleaning layer, the surface of the cleaning layer forming at least one surface of the cleaning sheet, the cleaning layer containing a urethane polymer and a vinyl polymer.

In the present invention, the vinyl polymer may be an acrylic polymer.

Further, the cleaning layer may be one that includes a mixture of a urethane polymer and a vinyl monomer cured by irradiation of radiation.

Also, the cleaning layer may be formed by reacting a polyol and a polyisocyanate in the presence of a vinyl monomer to form a urethane polymer to obtain a mixture containing the urethane polymer and the vinyl monomer and irradiating radiation to the mixture to cure it.

Further, the cleaning layer may have an initial elastic modulus of 0.5 to 100 $N/mm^2$.

In the present invention, the cleaning sheet may further have a backing layer.

Also, the cleaning layer may be provided on one side of the backing layer and a pressure-sensitive adhesive layer may be provided on another side of the backing layer.

The transporting member of the present invention includes one of the aforementioned cleaning sheets provided on a support.

Here, the cleaning sheet may be provided on the support with a sticking means.

Further, the support may be a wafer.

The method of producing a cleaning sheet according to the present invention includes the steps of: making a mixture containing a urethane polymer and a vinyl monomer by reacting a polyol and a polyisocyanate in the presence of one vinyl monomer to form the urethane polymer; coating the mixture on a release sheet or a base material sheet; and irradiating radiation onto the coated mixture to cure and form the cleaning layer.

The method of cleaning a probe needle according to the present invention includes contacting a cleaning layer of either one of the aforementioned cleaning sheets on a probe needle of a probe card to remove foreign matter adhering on the tip of the probe needle.

DETAILED DESCRIPTION

Figure 1A:
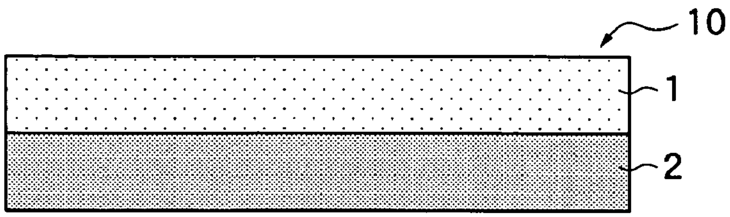
FIG. 1A is a diagram showing the construction of the cleaning sheet according to a first embodiment of the present invention.

The cleaning sheet of the present invention has a cleaning layer on one surface thereof. The cleaning layer contains a urethane polymer and a vinyl polymer. Here, the vinyl polymer is preferably an acrylic polymer.

In the present invention, the cleaning layer may be formed by irradiating radiation to a mixture containing a urethane polymer and a vinyl monomer to cure it and contains the urethane polymer and the vinyl polymer as described above. Further, in the present invention, the cleaning layer may be formed also by first preparing the urethane polymer in the presence of a vinyl monomer and then irradiating radiation to a mixture of the resultant urethane polymer and a radical polymerizable monomer to cure it.

Note that the concept of "sheet" as used herein includes a film and the concept of "film" as used herein includes a sheet.

The vinyl monomers that can be used include those vinyl monomers having radical polymerizable unsaturated double bonds. From the viewpoint of reactivity, acrylic monomers are preferable.

Examples of acrylic monomers that can be preferably used include (meth)acrylic acid, methyl (meth)acrylate, ethyl (meth)acrylate, propyl (meth)acrylate, butyl (meth)acrylate, pentyl (meth)acrylate, hexyl (meth)acrylate, 2-ethylhexyl (meth)acrylate, octyl (meth)acrylate, isooctyl (meth)acrylate, nonyl (meth)acrylate, isononyl (meth)acrylate, isobornyl (meth)acrylate, 2-hydroxyethyl (meth)acrylate, 4-hydroxybutyl (meth)acrylate, and 6-hydroxyhexyl (meth)acrylate. These (meth)acrylic monomers may be used singly or two or more of them may be used in combination.

Further, together with these (meth)acrylic monomers, there can also be used monomers such as vinyl acetate, vinyl propionate, acrylamide, methacrylamide, mono- or diesters of maleic acid, styrene and derivatives thereof, N-methylolacrylamide, glycidyl acrylate, glycidyl methacrylate, N,N-dimethylaminoethyl acrylate, N,N-dimethylaminopropyl methacrylamide, 2-hydroxypropyl acrylate, acryloylmorpholine, N,N-dimethylacrylamide, N,N-diethylacrylamide, imidoacrylate, N-vinylpyrrolidone, oligo ester acrylate, and ε-caprolactone acrylate. These monomers may be copolymerized with the (meth) acrylic monomers. Selection of these monomers may be made properly taking into consideration the characteristics of high polymers to be obtained.

In the present invention, polyfunctional monomers such as trimethylolpropane triacrylate and dipentaerythritol hexaacrylate may further be used as crosslinking agents as necessary.

The mixture containing a vinyl monomer includes a photopolymerization initiator. Preferable examples of the photopolymerization initiator that can be used include benzoin ethers such as benzoin methyl ether and benzoin isopropyl ether substituted benzoin ethers such as anisole methyl ether, substituted acetophenone such as 2,2-diethoxyacetophenone and 2,2-dimethoxy-2-phenylacetophenone, substituted α-ketols such as 1-hydroxycyclohexyl phenyl ketone and 2-methyl-2-hydroxypropiophenone, aromatic sulfonyl chloride such as 2-naphthalenesulfonyl chloride, optically active oximes such as 1-phenyl-1,1-propanedione-2-(o-ethoxycarbonyl)-oxime.

The urethane polymer is obtained by reacting a polyol and a polyisocyanate. In the reaction between isocyanate and hydroxyl groups of the polyol, a catalyst may be used. For example, those catalysts that are generally used in urethane reactions, such as dibutyltin dilaurate, and tin octoate, 1,4-diazabicyclo[2.2.2]octane may be used.

The polyol means a compound having two or more hydroxyl groups in one molecule. Low molecular weight polyols include divalent alcohols such as ethylene glycol, diethylene glycol, propylene glycol, butylene glycol, and hexamethylene glycol, trivalent or tetravalent alcohols such as trimethylolpropane, glycerin, and pentaerythritol.

The high molecular weight polyols include polyether polyols such as those obtained by addition polymerization of ethylene oxide, propylene oxide, and tetrahydrofuran; or polyester polyols consisting of polycondensates between the aforementioned divalent alcohols, dipropylene glycol, 1,4-butanediol, 1,6-hexanediol, neopentyl glycol and the like and dibasic acids such as adipic acid, azelaic acid, sebacic acid and the like; acrylic polyols, carbonate polyols, epoxy polyols, caprolactone polyols and the like. The acrylic polyols include copolymers of monomers having a hydroxyl group, such as hydroxyethyl (meth)acrylate and hydroxypropyl (meth) acrylate as well as copolymers of a compound containing a hydroxyl group with an acrylic monomer and the like. The epoxy polyols include amine-modified epoxy resins and the like.

These polyols may be used singly or two or more of them may be used in combination taking into consideration the characteristics of the high polymers to be obtained, solubility in radical polymerizable monomers, reactivity with isocyanate and so forth.

The polyisocyanates include aromatic, aliphatic, and alicyclic diisocyanates, dimers, trimers, etc. of these diisocyanates. The aromatic, aliphatic, and alicyclic diisocyanates include tolylene diisocyanate, diphenylmethane diisocyanate, hexamethylene diisocyanate, xylylene diisocyanate, hydrogenated xylylene diisocyanate, isophorone diisocyanate, hydrogenated diphenylmethane diisocyanate, 1,5-naphthylene diisocyanate, 1,3-phenylene diisocyanate, 1,4-phenylene diisocyanate, butane-1,4-diisocyanate, 2,2,4-trimethylhexamethylene diisocyanate, 2,4,4-trimethylhexamethylene diisocyanate, cyclohexane-1,4-diisocyanate, dicyclohexylmethane-4,4-diisocyanate, 1,3-bis (isocyanatomethyl)cyclohexane, methylcyclohexane diisocyanate, and m-tetramethylxylylene diisocyanate and so forth. Further, dimers and trimers of these diisocyanates as well as polyphenylmethane polyisocyanates may be used. The trimers include isocyanurate type, biuret type, allophanate type and the like, and proper types may be used.

Also, these polyisocyanates may be used singly or two or more of them may be used in combination taking into consideration the characteristics of the high polymer to be obtained, solubility in radical polymerizable monomers, reactivity with a hydroxyl group and so forth.

In the present invention, the amounts of the polyol component and polyisocyanate component to be used for the formation of urethane polymers are not particularly limited; for example, the amount of the polyol component is preferably such that NCO/OH (equivalent ratio) with respect to the polyisocyanate component is 0.8 to 3.0, more preferably 1.0 to 3.0. At an NCO/OH ratio of below 0.8 or above 3.0, the length of the molecular chain of the urethane polymer cannot be extended sufficiently, so that the urethane polymer tends to have reduced strength and elongation.

The cleaning layer according to the present invention may as necessary contain those additives that are usually used, for example, antioxidants, fillers, pigments, colorants, flame retardants, antistatics, and ultraviolet absorbents in amounts within the range in which the effects of the present invention are not deteriorated. The additives may be preliminarily added before the polymerization reaction between the polyisocyanate and polyol or before the polymerization of the urethane polymer with a reactive monomer.

Further, a small amount of a solvent may be added to a material for preparing the cleaning layer in order to adjust the viscosity for coating the material. The solvent may be properly selected from those solvents that are usually used. Examples of the solvent include ethyl acetate, toluene, chloroform, and dimethylformamide.

The initial elastic modulus of the cleaning layer is preferably within the range of 0.5 to 100 $N/mm^2$, more preferably within the range of 1 to 50 $N/mm^2$. At an initial elastic modulus of below 0.5 $N/mm^2$, the foreign matter sticking to the probe needle may sometimes be removed incompletely. On the other hand, at an initial elastic modulus of above 100 $N/mm^2$, sometimes the tip of the probe needle may be insufficiently inserted in the cleaning layer. Here, “initial elastic modulus” refers to a value obtained by performing tensile tests on test samples of 1 $mm^2$ in cross section and 10 mm in length at a drawing rate of 300 mm/minute using Autograph AGS-50D Model (manufactured by Shimadzu Corporation) as a tensile test machine, plotting the tests results to obtain the first linear portion of a stress-strain curve, and calculating an elastic modulus according to the following equation:

$$\text{Initial elastic modulus} = \frac{F/A}{\Delta L/L_0} \quad (1)$$

where F indicates a tensile stress at the time $\Delta L/L_0$ is 0.05, that is, a strain (elongation) is 0.05, A indicates a cross sectional area, $\Delta L$ indicates a length variation of a test sample, and $L_0$ indicates an initial length of a sample.

The cleaning sheet of the present invention may further have a backing layer. For example, the cleaning layer may be provided directly on the backing layer, or through a pressure-sensitive adhesive layer. Further, the cleaning sheet of the present invention may have a pressure-sensitive adhesive layer on its side opposite to the side where the backing layer is provided.

The materials that forms the backing layer include, for example, thermoplastic resins including polyester resins such as polyethylene terephthalate (PET), polyolefin resins such as polyethylene (PE) and polypropylene (PP), polyimides (PI), polyether ether ketone (PEEK), polyvinyl chloride (PVC), polyvinylidene chloride resins, polyamide resins, polyurethane resins, polystyrene resins, acrylic resins, fluorocarbon resins, cellulose resins, and polycarbonate resins as well as thermo setting resins. Note that the backing layer may be either of a single layer structure or of a multilayer structure consisting of a plurality of layers that are the same or different from each other.

The pressure-sensitive adhesives that form the pressure-sensitive adhesive layers are not particularly limited and those generally used, such as acrylic pressure-sensitive adhesives, rubber-based pressure-sensitive adhesives and the like may be used. The method of forming the pressure-sensitive adhesive layer is not particularly limited. For example, a method in which a pressure-sensitive adhesive based on a solvent or emulsion is directly coated on a backing layer or support and dried, or a method may be applied, in which a pressure-sensitive adhesive layer preliminarily formed by applying a pressure-sensitive adhesive on a release sheet is stuck to a backing layer or the like, and so on. Also, a method may be applied, in which a photocurable pressure-sensitive adhesive is coated on a backing layer and radiation or the like is irradiated to both the pressure-sensitive adhesive layer and the cleaning layer to cure the cleaning layer and the pressure-sensitive layer simultaneously, thereby forming a pressure-sensitive layer.

Hereinafter, the layer structure of the cleaning sheet of the present invention will be described in detail with reference to the attached drawings.

FIG. 1A is a diagram showing the layer structure of the cleaning sheet according to a first embodiment of the present invention. In FIG. 1A, a cleaning sheet 10 has a cleaning layer 1 on one surface thereof. Here, the cleaning layer 1 is provided on a backing layer 2. Note that in the present invention, the cleaning sheet 10 may consist of the cleaning layer 1 only without having any backing layer.

Figure 1B:
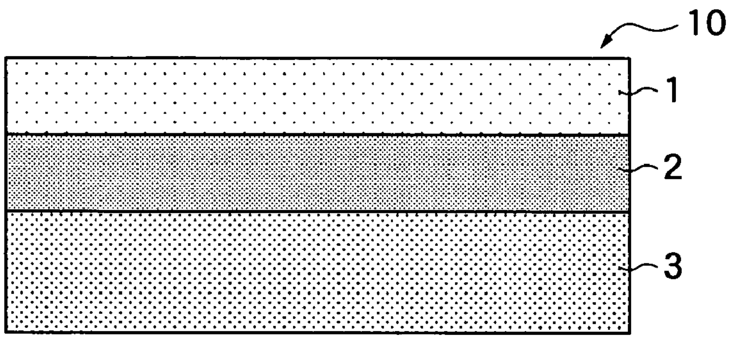
FIG. 1B is a diagram showing a layer structure of the cleaning sheet according to a second embodiment of the present invention.

FIG. 1B is a diagram showing the layer structure of the cleaning sheet according to a second embodiment of the present invention. In FIG. 1B, the cleaning layer 1 is provided on one side of the backing layer 2 and on the other side of the backing layer 2 is provided a pressure-sensitive adhesive layer 3.

The cleaning sheet having a pressure-sensitive adhesive layer on the back side thereof as stated above can be simply and firmly fixed to a base for mounting the cleaning sheet when a cleaning operation is performed. Note that a release sheet (separator) may be temporarily attached on the surface of the pressure-sensitive adhesive layer 3 in order to protect the pressure-sensitive adhesive layer 3 until it is used.

Then, the layer structure of the transporting member of the present invention will be described in detail with reference to the attached drawings.

Figure 2A:
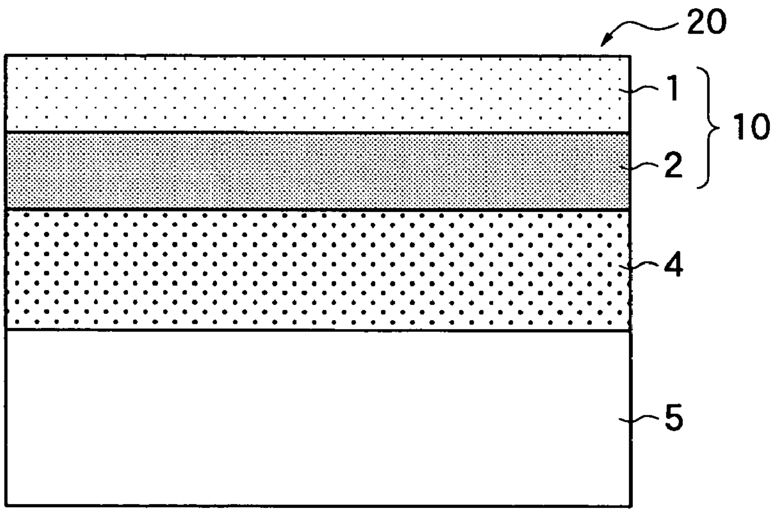
FIG. 2A is a diagram showing a layer structure of the transporting member according to the first embodiment of the present invention.

FIG. 2A is a diagram showing the layer structure of the transporting member according to a first embodiment of the present invention. In FIG. 2A, the cleaning sheet 10 having the cleaning layer 1 provided on one side of the backing layer 2 is arranged on a support 5 through a sticking means such as a pressure-sensitive adhesive layer 4. Note that the pressure-sensitive adhesive layer 4 may be the same as or different from the pressure-sensitive adhesive layer 3 of the cleaning sheet shown in FIG. 1B. In the case where the pressure-sensitive adhesive layer 4 is the same as the pressure-sensitive adhesive layer 3, the resultant structure is identical with the structure in which the cleaning sheet shown in FIG. 1B is directly arranged on the support 5. Further, the pressure-sensitive adhesive layer 4 may be a pressure-sensitive adhesive double coated tape.

Figure 2B:
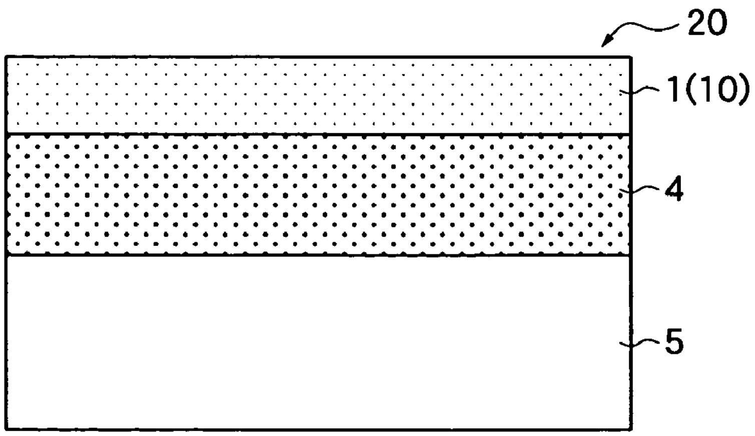
FIG. 2B is a diagram showing a layer structure of the transporting member according to the second embodiment of the present invention.

FIG. 2B is a diagram showing the layer structure of the transporting member according to a second embodiment of the present invention. Here, the cleaning layer 1 is arranged on the support 5 through the pressure-sensitive adhesive layer 4. Note that assuming that the cleaning sheet 10 is of a single layer that consists of the cleaning layer 1 only, the present embodiment may be deemed to be a structure in which the cleaning sheet 10 is arranged on the support 5 through the pressure-sensitive adhesive layer 4. Further, the sticking means as used herein means a treatment that allows for retention of a sticking state between the support 5 and the cleaning sheet; for example, the sticking means includes provision of the cleaning layer 1 directly on the support 5 by coating or the like to form a laminate of the support and the cleaning layer form a laminate in which they are in a state of sticking to each other The support 5 shown in FIGS. 2A and 2B may be a silicon wafer or the like. Since silicon wafers are polished such that unevenness in height in the vertical direction is within ±3 μm, cleaning operation performed, for example, by fixing the cleaning sheet 10 to a silicon wafer or the like will not deform the tip of the probe needle even when the probe needle is pushed to stick into the cleaning layer 1.

The cleaning sheet of the present invention is formed, for example, by coating a mixture containing a vinyl monomer on a backing layer or a release-coated sheet (release sheet or separator) and irradiating radiation on the resultant. Further, the transporting member of the present invention is formed, or example, by applying the cleaning sheet of the present invention on a support with a pressure-sensitive adhesive or the like or by coating a mixture containing a vinyl monomer directly on a support and irradiating radiation onto the resultant to cure the mixture.

Here, the coating methods that can be adopted include known methods such as casting, spin coating, and roll coating. The radiations to be irradiated include ionizing radiations such as α-ray, β-ray, γ-ray, neutron beam, and electron beam, radiations such as ultraviolet rays.

Here, to avoid inhibition of polymerization by oxygen, a release-coated sheet (release sheet or separator) may be placed on the side where the mixture containing the vinyl monomer is coated to block oxygen. Alternatively, the curing may be performed in a vessel in which an inert gas is filled to reduce the concentration of oxygen therein.

In the present invention, the kind of radiation and a lamp used for irradiation may be selected properly depending on the characteristics required for the sheet. For example, the amount of irradiation of radiation is generally 100 to 5,000 $mJ/cm^2$, preferably 1,000 to 4,000 $mJ/cm^2$, more preferably 2,000 to 3,000 $mJ/cm^2$. The amount of irradiation of radiation lower than 100 $mJ/cm^2$ may sometimes result in insufficient degree of polymerization. On the other hand, the amount of irradiation of radiation higher than 5,000 $mJ/cm^2$ may sometimes cause deterioration of the cleaning sheet.

In the present invention, the thicknesses of the cleaning sheet and of the cleaning layer are not particularly limited and may be properly selected depending on the purpose or use. However, the thickness of the cleaning layer is preferably 10 to 500 μm, more preferably 30 to 300μ since the tip of the probe needle must be inserted in the cleaning layer to a sufficient depth.

Hereinafter, a method of removing foreign matter on the tip of a probe needle of a probe card (cleaning operation) will be described by using, for example, a transporting member 20 according to the present invention with reference to FIG. 3.

Figure 3A:
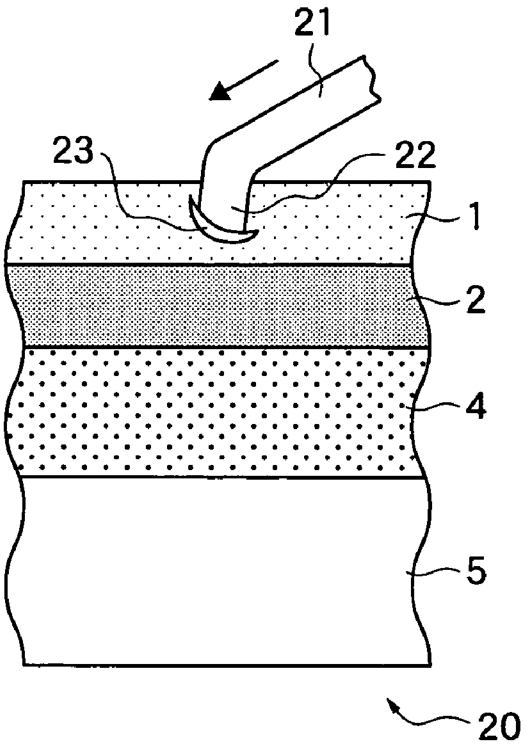
FIG. 3 is a diagram showing the state of the cleaning method of the present invention.
Figure 3B:
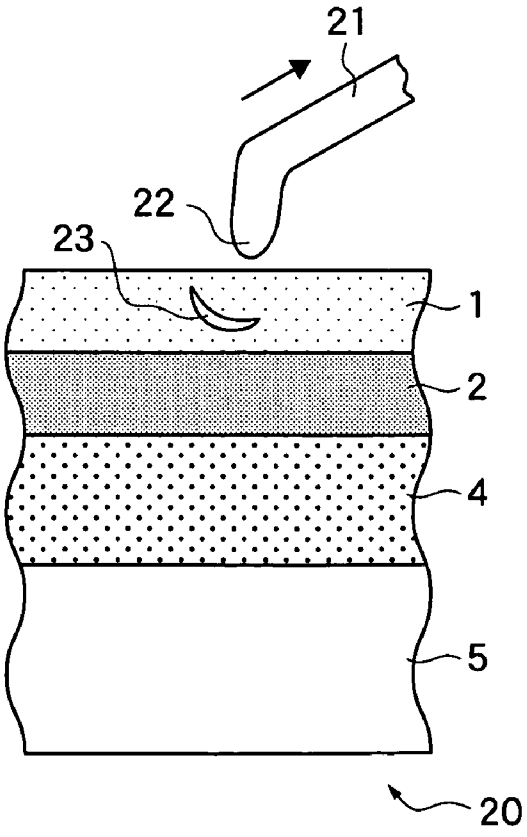

First, the cleaning layer 1 is arranged so as to face the probe card. That is, the transporting member is mounted on a base for fixing a wafer and the cleaning layer 1 is arranged to face the probe card. Then, after an edge 22 of a probe needle 21 is stuck into the cleaning layer 1 as shown in FIG. 3A, the probe needle 21 is drawn out from the cleaning layer 1 as shown in FIG. 3B. This motion allows foreign matter 23 such as aluminum oxide adhering at the tip of the probe needle to remain in the cleaning layer 1 and be removed from the probe needle. The motion is repeated for a predetermined number of times, for example, about 10 to about 30 times. It is preferable that the position of the cleaning layer where it is stuck by the probe needle be gradually moved, for example, by gradually translating the base for fixing the wafer in the horizontal direction so that the portion of the cleaning layer where no foreign matter remains is stuck by the probe needle. Since the cleaning layer of the present invention that contains a urethane polymer and a vinyl polymer allows the tip of the probe needle to be inserted therein to a sufficient depth and enables the removed foreign matter to be retained within the cleaning layer without fail, there will be no re-adhering of the foreign matter on the probe needle after the cleaning operation. Also, according to the present invention, it does not occur that a portion of the cleaning layer adheres on the tip of the probe needle, so that a process of washing the tip of the probe needle with an organic solvent or the like process is unnecessary.

EXAMPLES

Hereinafter, the present invention will be explained in more detail by examples and comparative examples. However, the present invention should not be considered to be limited by the examples and comparative examples.

Note that unless otherwise indicated specifically, all parts are by weight.

Synthesis Example I-1

In a reactor equipped with a condenser tube, a thermometer and a stirring device, 95 parts of n-butyl acrylate and 5 parts of acrylic acid as acrylic monomers, 0.3 part of trimethylolpropane triacrylate as a crosslinking agent, 0.3 part of 1-[4-(2-hydroxyethoxy)phenyl]-2-hydroxy-2-methyl-1-propan-1-one (trade name: "IRGACURE 2959", manufactured by Ciba Specialty Chemicals Corporation) as a photopolymerization initiator, 73.4 parts of polyoxytetramethylene glycol (molecular weight: 650, manufactured by Mitsubishi Chemical Corporation) as a polyol, and 0.05 part of dibutyltin dilaurate as a urethane reaction catalyst were charged and 26.6 parts of xylylene diisocyanate was dripped while stirring, followed by reaction at 65° C. for 2 hours to obtain a mixture of a urethane polymer and the acrylic monomer. Note that the amounts of the polyisocyanate component and of the polyol component were such that NCO/OH (equivalent ratio)=1.25.

Synthesis Example I-2

In a reactor equipped with a condenser tube, a thermometer and a stirring device, 75 parts of methyl acrylate and 75 parts of acrylic acid as acrylic monomers, 0.3 part of 1-[4-(2-hydroxyethoxy)phenyl]-2-hydroxy-2-methyl-1-propan-1-one (trade name: "IRGACURE 2959", manufactured by Ciba Specialty Chemicals Corporation) as a photopolymerization initiator, 73.4 parts of polyoxytetramethylene glycol (molecular weight: 650, manufactured by Mitsubishi Chemical Corporation) as a polyol, and 0.05 part of dibutyltin dilaurate as a urethane reaction catalyst were charged and 26.6 parts of xylylene diisocyanate was dripped while stirring, followed by reaction at 65° C. for 2 hours to obtain a mixture of a urethane polymer and the acrylic monomers. Note that the amounts of the polyisocyanate component and of the polyol component were such that NCO/OH (equivalent ratio)=1.25.

Synthesis Example I-3

In a reactor equipped with a condenser tube, a thermometer and a stirring device, 95 parts of n-butyl acrylate and 5 parts of acrylic acid as acrylic monomers, and 0.3 part of 1-[4-(2-hydroxyethoxy)phenyl]-2-hydroxy-2-methyl-1-propan-1-one (trade name: "IRGACURE 2959", manufactured by Ciba Specialty Chemicals Corporation) as a photopolymerization initiator were charged and exposed to ultraviolet rays under nitrogen atmosphere to partially effect photopolymerization, followed by addition of 0.3 part of trimethylolpropane triacrylate, a polyfunctional monomer and stirring to obtain a syrup containing a prepolymer.

Synthesis Example I-4

A syrup containing a prepolymer was obtained in the same manner as that in Synthesis Example I-3 except that in Synthesis Example I-3, 40 parts of methyl acrylate, 40 parts of ethyl acrylate, and 20 parts of N,N-dimethylacrylamide were used as the acrylic monomers, 0.1 part of 1-hydroxycyclohexyl phenyl ketone (trade name: "IRGACURE 184", manufactured by Ciba Specialty Chemicals Corporation) was used as the photopolymerization initiator, and 0.4 part of trimethylolpropane triacrylate was used as the polyfunctional monomer.

Synthesis Example I-5

In a reactor equipped with a condenser tube, a thermometer and a stirring device, 150 parts of toluene, 75.8 parts of polyoxytetramethylene glycol (molecular weight 650, manufactured by Mitsubishi Chemical Corporation) as a polyol, and 0.05 part of dibutyltin dilaurate as a urethane reaction catalyst were charged and 24.2 parts of xylylene diisocyanate was dripped while stirring, followed by reaction at 65° C. for 2 hours to obtain a urethane polymer solution. Note that the amounts of the polyisocyanate component and of the polyol component were such that NCO/OH (equivalent ratio)=1.1.

Synthesis Example II-1

In a reactor equipped with a condenser tube, a thermometer and a stirring device, 50 parts of methyl acrylate and 50 parts of n-butyl acrylate as acrylic monomers and 0.1 part of 1-hydroxycyclohexyl phenyl ketone (trade name: "IRGACURE 184", manufactured by Ciba Specialty Chemicals Corporation) as a photopolymerization initiator were charged and exposed to ultraviolet rays under nitrogen atmosphere to effect partial photopolymerization to obtain a syrup containing a prepolymer. To the partially polymerized syrup was added 0.2 part of trimethylolpropane triacrylate, a polyfunctional monomer and the mixture was stirred to obtain a syrup containing a prepolymer.

Synthesis Example II-2

In a reactor equipped with a condenser tube, a thermometer and a stirring device, 50 parts of t-butyl acrylate, 30 parts of acrylic acid and 20 parts of n-butyl acrylate as acrylic monomers, and 0.3 part of 1-[4-(2-hydroxyethoxy)phenyl]-2-hydroxy-2-methyl-1-propan-1-one (trade name: "IRGACURE 2959", manufactured by Ciba Specialty Chemicals Corporation) as a photopolymerization initiator, 73.4 parts of polyoxytetramethylene glycol (molecular weight: 650, manufactured by Mitsubishi Chemical Corporation) as a polyol, and 0.05 part of dibutyltin dilaurate as a urethane reaction catalyst were charged and 26.6 parts of xylylene diisocyanate was dripped while stirring, followed by reaction at 65° C. for 2 hours to obtain a mixture of a urethane polymer and the acrylic monomers. Note that the amounts of the polyisocyanate component and of the polyol component were such that NCO/OH (equivalent ratio)=1.25.

Synthesis Example II-3

A mixture of a urethane polymer and the acrylic monomers was obtained in the same manner as that in Synthesis Example II-2 except that in Synthesis Example II-2, the acrylic monomers were changed to 50 parts of t-butyl acrylate and 50 parts of acrylic acid.

Synthesis Example II-4

A mixture of a urethane polymer and the acrylic monomers was obtained in the same manner as that in Synthesis Example II-2 except that in Synthesis Example II-2, the acrylic monomers were changed to 50 parts of acryloylmorpholine and 50 parts of acrylic acid.

Examples 1 to 5, Comparative Examples 1, 2 and 4

The mixtures of the urethane polymers and acrylic monomers obtained in Synthesis Examples I-1, I-2, II-2 to II-4 and the syrups containing a prepolymer obtained in Synthesis Examples I-3, I-4 and II-1 were used under the conditions as shown in Tables 1 and 2 and coated on 100-μm-thick PET films, respectively, to a thickness (after curing) of 100 μm. On each coating was superposed a release-coated PET film (38 μm in thickness) as a separator to cover the coating, followed by irradiation of ultraviolet rays from a high pressure mercury lamp (illuminance: 170 $mW/cm^2$, light amount: 2,500 $mJ/cm^2$) from above the separator to cure the coating to form a cleaning layer. Thereafter, the release-coated PET film (separator) was peeled off to obtain a cleaning sheet.

Evaluation tests performed on each of the obtained cleaning sheets as described below gave the results shown in Tables 1 and 2.

Comparative Example 3

The urethane polymer solution obtained in Synthesis Example I-5 was used as shown in Table 1 and coated on a 100-μm-thick PET film to a thickness (after curing) of 100 μm. This was dried at 25° C. under reduced pressure to form a cleaning layer.

Evaluation tests performed on the obtained cleaning layer as described below gave the results shown in Table 1.

Evaluation Test

In a prober, a probe card with 20 probe needles was continually contacted on a wafer covered with aluminum all over the surface at an overdrive amount of 60 μm 10,000 times. After the contacting 10,000 times, the probe card was contacted on a cleaning sheet mounted on a stage at an overdrive amount of 60 μm 30 times to perform cleaning of the probe needles. Note that the cleaning was performed such that when the tips of the probe needles of the probe card were contacted on the cleaning sheet, the stage was moved to avoid contact of the tips of the probe needles at the same position of the cleaning sheet. After completion of the cleaning, the tips of the probe needles were observed under a scanning electron microscope (SEM) to check if foreign matter that had adhered to the needles remained. Furthermore, in observation on SEM, it was also checked if a portion of the cleaning layer adhered on the tips of the probe needles, that is, if the cleaning layer was transferred to the probe needles.

The mixtures of the urethane polymers and acrylic monomers obtained in Synthesis Examples I-1, I-2, II-2 to II-4 and the syrups containing a prepolymer obtained in Synthesis Examples I-3, I-4 and II-1 were coated on release-coated PET films (38 μm in thickness), respectively, to a thickness (after curing) of 100 μm. On each coating was superposed a release-coated PET film (38 μm in thickness) as a separator to cover the coating, followed by irradiation of ultraviolet rays from a high pressure mercury lamp (illuminance: 170 mW/cm$^2$, light amount: 2,500 mJ/cm$^2$) from above the separator to cure the coating to form a cleaning layer. Each of the cleaning layers was subjected to tensile test of the cleaning layer after peeling off the separator and release-coated PET film and initial elastic modulus was obtained in accordance with the equation (1) above.

The urethane polymer solution obtained in Synthesis Example I-5 was coated on a release-coated PET film (38 μm in thickness) to a thickness (after curing) of 100 μm. This was dried at 25° C. under reduced pressure to form a cleaning layer. The cleaning layer was subjected to tensile test of the cleaning layer after peeling off the release-coated PET film and initial elastic modulus was obtained in accordance with the equation (1) above.

TABLE 1

| | Cleaning layer | Urethane/ acrylic ratio | Foreign matter | Transfer of cleaning layer | Initial elastic modulus (N/mm$^2$) |
|---|---|---|---|---|---|
| Example 1 | Synthesis Example I-1 | 100/100 | No | No | 1.2 |
| Example 2 | Synthesis Example I-2 | 100/150 | No | No | 89 |
| Comparative Example 1 | Synthesis Example I-3 | | Yes | Yes | 0.1 |
| Comparative Example 2 | Synthesis Example I-4 | | Yes | No | 158 |
| Comparative Example 3 | Synthesis Example I-5 | | Yes | No | 2 |

TABLE 2

| | Cleaning layer | Urethane/ acrylic ratio | Foreign matter | Transfer of cleaning layer | Initial elastic modulus (N/mm$^2$) |
|---|---|---|---|---|---|
| Example 3 | Synthesis Example II-2 | 100/100 | No | No | 2 |
| Example 4 | Synthesis Example II-3 | 100/100 | No | No | 16 |
| Example 5 | Synthesis Example II-4 | 100/100 | No | No | 60 |

TABLE 2-continued

| | Cleaning layer | Urethane/ acrylic ratio | Foreign matter | Transfer of cleaning layer | Initial elastic modulus (N/mm$^2$) |
|---|---|---|---|---|---|
| Comparative Example 4 | Synthesis Example II-1 | | Yes | Yes | 0.3 |

The results shown in Tables 1 and 2 clearly confirm that no foreign matter remained on the tips of the probe needles according to the present invention of Examples 1 to 5 after cleaning and that a partial transfer of the cleaning layer to the tip of the probe needle did not occur at all. Therefore, according to the present invention, there occurred no situation where the tips of the probe needles were contaminated with the cleaning layer. Note that the cleaning sheets of Examples 1 to 5 had initial elastic moduli within the range of 0.5 to 100 N/mm$^2$.

On the other hand, in the case of the cleaning sheets of Comparative Examples 1 to 4, it revealed that the foreign matter remained after the cleaning. Further, when cleaning was performed using the cleaning sheet of Comparative Example 1 or Comparative Example 4, transfer of the cleaning layer to the tip of the probe needle was observed.

According to the present invention, there can be provided a cleaning sheet that enables foreign matter adhering on a probe needle of a probe card to be completely removed from the probe needle without wearing the probe needle and that does not allow for re-adhering of the foreign matter once removed from the needle and also a method of producing such a cleaning sheet as well as a transporting member having such a cleaning sheet. Also, according to the present invention, there can be provided a cleaning method that can completely remove foreign matter from probe needles by using the cleaning sheet or transporting member without damaging or deforming the probe needles and that can prevent re-adhering of the foreign matter.

The invention claimed is:

1. A cleaning sheet for removing foreign matter adhering on a tip of a probe needle of a probe card, comprising a cleaning layer having a surface, the surface of the cleaning layer forming one surface of the cleaning sheet, wherein the cleaning layer contains a urethane polymer and a vinyl polymer comprising an acrylic polymer, wherein said cleaning layer contains additives in amounts within a range in which the probe needle is not worn, wherein the cleaning layer has an initial elastic modulus within a range of 0.5-100 N/mm$^2$ and is adapted to receive penetrating probe needles and remove and retain impurities from a tip of said probe needles such that there will be no re-adhering of the foreign matter or the cleaning layer material on the probe needle after the cleaning operation, and wherein said cleaning layer has a thickness within a range of 10 to 500 μm.

2. The cleaning sheet as claimed in claim 1, wherein the vinyl polymer is an acrylic polymer.

3. The cleaning sheet as claimed in claim 1, wherein the cleaning layer is formed by irradiating radiation to a mixture containing a urethane polymer and a vinyl monomer to cure it and contains the urethane polymer and a vinyl polymer.

4. The cleaning sheet as claimed in claim 1, wherein the cleaning layer is formed by reacting a polyol and a polyisocyanate in the presence of a vinyl monomer to form the urethane polymer to form a mixture containing the urethane polymer and a vinyl monomer, and irradiating the mixture with radiation to cure it.

5. The cleaning sheet as claimed in claim 1, further comprising a backing layer.

6. The cleaning sheet as claimed in claim 5, further comprising a pressure-sensitive adhesive layer, wherein the cleaning layer is provided on one surface of the backing layer and the pressure-sensitive adhesive layer is provided on another surface of the backing layer.

7. A transporting member comprising a support and the cleaning layer of claim 1 provided on the support.

8. The transporting member as claimed in claim 7, wherein the cleaning sheet is provided on the support through a sticking means.

9. The transporting member as claimed in claim 7, wherein the support is a wafer.

10. A method of producing a cleaning sheet, comprising the steps of:

reacting a polyol and a polyisocyanate in the presence of a vinyl monomer to form a urethane polymer, thereby forming a mixture containing the urethane polymer and the vinyl monomer;

coating the mixture on a release sheet or a backing layer; and irradiating the coated mixture with radiation to cure the mixture to form the cleaning layer, wherein said cleaning layer contains additives in amounts within a range in which the probe needle is not worn, wherein the cleaning layer has an initial elastic modulus within a range of 0.5-100 $N/mm^2$ and is adapted to receive penetrating probe needles and remove and retain impurities from a tip of said probe needles such that there will be no re-adhering of the foreign matter or the cleaning layer material on the probe needle after the cleaning operation, and wherein said cleaning layer has a thickness within a range of 10 to 500 μm.

11. A method of cleaning a probe needle, comprising contacting a cleaning layer of the cleaning sheet with a probe needle of a probe card having a tip to remove foreign matter adhering on the tip of the probe needle, wherein said cleaning sheet comprises a cleaning layer having a surface, the surface of the cleaning layer forming one surface of the cleaning sheet, wherein the cleaning layer contains a urethane polymer and a vinyl polymer comprising an acrylic polymer, wherein, said cleaning layer contains additives in amounts within a range in which the probe needle is not worn, wherein the cleaning layer has an initial elastic modulus within a range of 0.5-100 $N/mm^2$ and is adapted to receive penetrating probe needles and remove and retain impurities from a tip of said probe needles such that there will be no re-adhering of the foreign matter or the cleaning layer material on the probe needle after the cleaning operation, and wherein said cleaning layer has a thickness within a range of 10 to 500 μm.

12. A method of cleaning a probe needle, comprising contacting a cleaning layer of a transporting member with a probe needle of a probe card having a tip to remove foreign matter adhering on the tip of the probe needle, wherein said transporting member comprises a support and a cleaning layer having a surface, the surface of the cleaning layer forming one surface of the transporting member, wherein the cleaning layer contains a urethane polymer and a vinyl polymer comprising an acrylic polymer, wherein said cleaning layer contains additives in amounts within a range in which the probe needle is not worn, wherein the cleaning layer has an initial elastic modulus within a range of 0.5-100 $N/mm^2$ and is adapted to receive penetrating probe needles and remove and retain impurities from a tip of said probe needles such that there will be no re-adhering of the foreign matter or the cleaning layer material on the probe needle after the cleaning operation, and wherein said cleaning layer has a thickness within a range of 10 to 500 μm.

13. A cleaning sheet for removing foreign matter adhering on a tip of a probe needle of a probe card, comprising a cleaning layer having a surface, the surface of the cleaning layer forming one surface of the cleaning sheet, wherein the cleaning layer contains a urethane polymer and a vinyl polymer comprising an acrylic polymer, wherein said cleaning layer contains no additives in amounts within a range in which the probe needle is worn, wherein the cleaning layer has an initial elastic modulus within a range of 0.5-100 $N/mm^2$ and is adapted to receive penetrating probe needles and remove and retain impurities from a tip of said probe needles such that there will be no re-adhering of the foreign matter or the cleaning layer material on the probe needle after the cleaning operation, and wherein said cleaning layer has a thickness within a range of 10 to 500 μm.

14. The cleaning sheet as claimed in claim 13, further comprising a backing layer.

15. The cleaning sheet as claimed in claim 14, further comprising a pressure-sensitive adhesive layer, wherein the cleaning layer is provided on one surface of the backing layer and the pressure-sensitive adhesive layer is provided on another surface of the backing layer.

16. A transporting member comprising a support and the cleaning layer of claim 13 provided on the support.

17. A method of producing a cleaning sheet, comprising the steps of:

reacting a polyol and a polyisocyanate in the presence of a vinyl monomer to form a urethane polymer, thereby forming a mixture containing the urethane polymer and the vinyl monomer;

coating the mixture on a release sheet or a backing layer: and irradiating the coated mixture with radiation to cure the mixture to form the cleaning layer, wherein said cleaning layer contains no additives in amounts within a range in which the probe needle is worn, wherein the cleaning layer has an initial elastic modulus within a range of 0.5-100 $N/mm^2$ and is adapted to receive penetrating probe needles and remove and retain impurities from a tip of said probe needles such that there will be no re-adhering of the foreign matter or the cleaning layer material on the probe needle after the cleaning operation, and wherein said cleaning layer has a thickness within a range of 10 to 500 μm.

18. A method of cleaning a probe needle, comprising contacting a cleaning layer of the cleaning sheet with a probe needle of a probe card having a tip to remove foreign matter adhering on the tip of the probe needle, wherein said cleaning sheet comprises a cleaning layer having a surface, wherein the surface of the cleaning layer forms one surface of the cleaning sheet, wherein the cleaning layer contains a urethane polymer and a vinyl polymer comprising an acrylic polymer, wherein said cleaning layer contains no additives in amounts within a range in which the probe needle is worn, wherein the cleaning layer has an initial elastic modulus within a range of 0.5-100 $N/mm^2$ and is adapted to receive penetrating probe needles and remove and retain impurities from a tip of said probe needles such that there will be no re-adhering of the foreign matter or the cleaning layer material on the probe needle after the cleaning operation, and wherein said cleaning layer has a thickness within a range of 10 to 500 μm.

19. A method of cleaning a probe needle, comprising contacting a cleaning layer of a transporting member with a probe needle of a probe card having a tip to remove foreign matter adhering on the tip of the probe needle, wherein said transporting member comprises a support and a cleaning layer having a surface, wherein the surface of the cleaning layer forms one surface of the transporting member, wherein the cleaning layer contains a urethane polymer and a vinyl polymer comprising an acrylic polymer, wherein said cleaning layer contains no additives in amounts within a range in which the probe needle is worn, and wherein the cleaning layer has an initial elastic modulus within a range of 0.5-100 $N/mm^2$ and is adapted to receive penetrating probe needles and remove and retain impurities from a tip of said probe needles such that there will be no re-adhering of the foreign matter or the cleaning layer material on the probe needle after the cleaning operation, and wherein said cleaning layer has a thickness within a range of 10 to 500 μm.

* * * * *